(12) United States Patent
Ethirajan

(10) Patent No.: US 6,542,336 B2
(45) Date of Patent: Apr. 1, 2003

(54) INERTIAL LATCH FOR HEAD PROTECTION IN A LINEAR HEAD ACTUATOR REMOVABLE DATA STORAGE DRIVE

(75) Inventor: Arulmani Ethirajan, Waldorf Mansions (SG)

(73) Assignee: Iomega Corporation, Roy, UT (US)

( * ) Notice: Subject to any disclaimer, the term of this patent is extended or adjusted under 35 U.S.C. 154(b) by 27 days.

(21) Appl. No.: 09/872,045

(22) Filed: Jun. 1, 2001

(65) Prior Publication Data

US 2002/0181158 A1 Dec. 5, 2002

(51) Int. Cl.[7] .................................................. G11B 5/54
(52) U.S. Cl. ..................................................... 360/256.4
(58) Field of Search ................. 360/256.4, 97.02–97.04

(56) References Cited

U.S. PATENT DOCUMENTS

| 5,404,257 A | 4/1995 | Alt .............................. 360/105 |
| 5,650,891 A | 7/1997 | Thayne et al. ........... 360/99.06 |
| 6,091,587 A | 7/2000 | Hatch et al. ............. 360/256.4 |

Primary Examiner—George J. Letscher
(74) Attorney, Agent, or Firm—Woodcock Washburn LLP

(57) ABSTRACT

An inertial latch for a linear actuator disk drive includes a carriage assembly carrying read/write heads linearly into and out of engagement with a recording medium. An arm rotating about a pivot has one end which engages the latch, and a counterweight on the other end of said arm. A key on the counterweight slides linearly in a slot as the carriage assembly moves linearly. The key fits into a keying portion of the slot which constrains said counterweight so that it cannot move if it is tilted by gravity or shock.

10 Claims, 7 Drawing Sheets

INERTIAL LATCH FOR HEAD PROTECTION IN A LINEAR HEAD ACTUATOR REMOVABLE DATA STORAGE DRIVE

BACKGROUND OF THE INVENTION

This invention relates to disk drive systems. More particularly, the invention relates to the protection of disk drive linear actuators from mechanical shock forces.

Disk based data storage devices for storing digital electronic information have been in use in the computer industry for several decades. The storage devices operate by storing digital information on disk media such as magnetic, magneto-optical or optical medias. The disks can be either rigid or flexible and are mounted on a rotating hub. These storage devices are commonly referred to as disk drives. Disk drives store data on removable media cartridges or they are fixed media drives.

Removable media drives accept the disk media in the form of a removable cartridge. When the cartridge is inserted into a disk drive, a spindle motor in the drive couples with the disk hub in order to rotate the disk within the cartridge at a given speed. The outer shell of the cartridge typically has a media access opening proximate one edge. The access opening provides the recording heads of the drive with access to the disk. To cover the head access opening when the cartridge is not in use, a shutter or door mechanism is provided that prevents dust or other contaminants from entering the cartridge and settling on the recording surface of the disk. The shutter is commonly biased to a closed position with a spring bias. To open the shutter and gain access to the media, the drive employs a mechanism that overcomes the spring bias.

Disk drives typically employ either a linear actuator mechanism or a rotary actuator mechanism. The actuator positions the read/write head(s) of the disk drive on the recording surface(s) of the disk. The linear or rotary actuators must be able to move off, and away from, the storage medium to a retracted position, also commonly referred to as the park position. This retracted position prevents damage to the head(s), for example, when a cartridge is inserted and removed from the disk drive or when the drive is moved. Moreover, many removable cartridge disk drives employ a pair of opposing read/write heads for recording and reproducing information on both side of a storage medium. Typically, the opposing heads are disposed on flexible suspension arms at the distal end of an actuator that allow the heads to fly closely over the respective surface of the rotating disk.

Increasingly, disk drives must meet rigorous mechanical shock and vibration standards. Rigorous standards are necessary because current drive applications include hand held computers, digital cameras, and other portable computer appliances. The portable nature of these applications increase the likelihood that the drive will be subject to shocks and vibrations. For example, the computer appliance may be dropped or jarred. When experiencing mechanical shock or vibration, the actuator could inadvertently move from its retracted position causing serious damage to delicate drive components.

The protection of actuators from mechanical shocks and vibration has been addressed by prior art mechanisms. For example, U.S. Pat. No. 5,404,257 (Alt) has used an inertial latch mechanism that allegedly prevents a disk drive actuator from moving out of a retracted position during mechanical shocks. The Alt inertial latch mechanism accomplishes this by employing an inertial body and pivotal latch member. When a mechanical shock is experienced by the drive, the shock force causes the inertial body to contact the latch. As a result, the latch member closes on an abutment on the actuator and prevents it from moving completely out of the parked position. The latching is accomplished without the aid of electrical power.

U.S. Pat. No. 6,091,587 Hatch et al. also describes a mechanism for restraining the head components in a disk drive. The mechanism comprises a mass member having a pivot point. The pivot point is located substantially proximate to the center of mass so that the mass pivots in response to an external force. The mechanism also comprises spring member that biases the mass to a predefined position. Additionally, two latch members are coupled to the mass member, each latch member having a protruding cammed end that is adapted to engage the component. The latch members are arranged such that their respective cammed ends protrude in opposing directions. The latch members are coupled to the mass member so that the center of weight of the inertial mass is substantially opposite to the latch members on the other side of the pivot point.

U.S. Pat. No. 5,650,891, Thayne et al., describes a ZIP® drive having a linear actuator for use in Notebook computers.

It is an object of the present invention to provide an improved inertial latch for linear head actuator drives.

SUMMARY OF THE INVENTION

In accordance with the present invention, an inertial latch for a linear actuator disk drive includes a latch on the carriage assembly and an arm rotating about a pivot. One end of the arm engages the latch. A counterweight on the other end of the arm has a key which slides linearly in a slot as the carriage assembly moves linearly. The key fits into a keying portion of a slot in the chassis. The key cannot move out of the keying portion of the slot if the counterweight is titled by gravity, shock or the like.

In accordance with the invention no external electromechanical devices are used to actuate the head protect mechanism. The head actuator itself actuates the latch. Inertial forces acting on the actuator latch the actuator during either linear or rotational or combined shock conditions.

Further in accordance with the invention, a ramp feature on the actuator resets the latch during parking of the heads. An inertial force on the actuator (the total moving mass) will also act on the balanced mass at the end of the rotary arm. This action will prevent the heads moving to an unprotected position.

Pendulum action of the counterweight latches the rotary arm during rotational shock condition. The key slot on the chassis does not allow the key on the counterweight to slide the counterweight if tilted due to rotary shock. The key has a round shape which slides against the rounded corner of the key slot.

The geometry of the rotary action of the latch and linear action of the actuator is used to release the heads by the action of the head actuator.

Other objects, features, and advantages of the invention will be better understood from the following, more detailed description and appended claims.

SHORT DESCRIPTION OF THE DRAWINGS

DESCRIPTION OF THE PREFERRED EMBODIMENT

Figure 1:
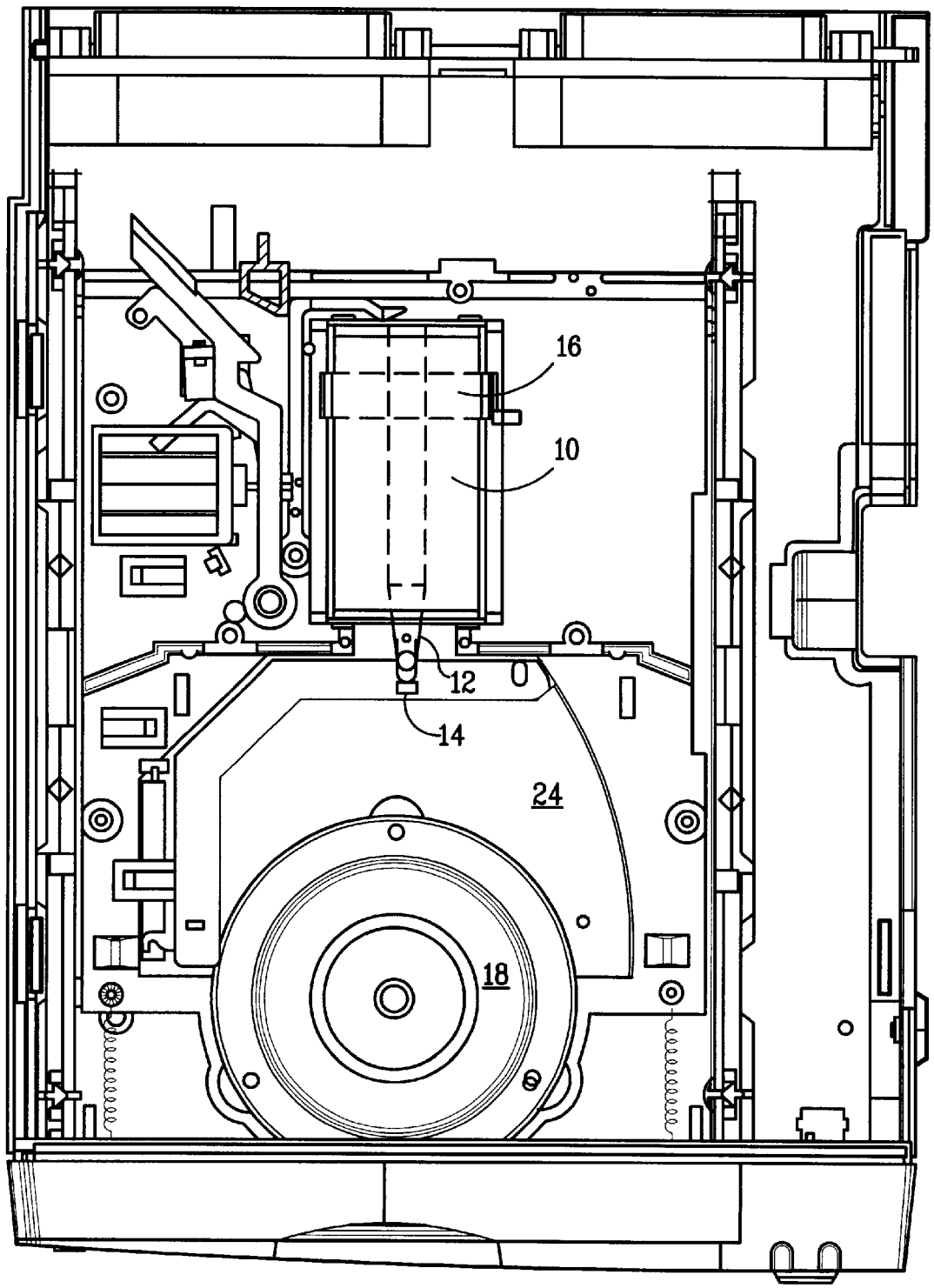
FIG. 1 shows the disk drive of the present invention with the top cover removed.

FIG. 1 is a top view of a disk drive of the type shown in U.S. Pat. No. 5,650,891, Thayne et al., with the top cover removed.

The linear actuator 10 comprises a carriage assembly having two lightweight flexible arms 12. The recording heads 14 of the disk drive are mounted at the ends of the respective arms. A coil 16, which is part of a voice coil motor, is mounted at the opposite end of the carriage. The coil interacts with magnets (not shown) to move the carriage linearly so that the heads 14 can move radially over respective recording surfaces of a disk cartridge inserted into the disk drive.

Figure 2:
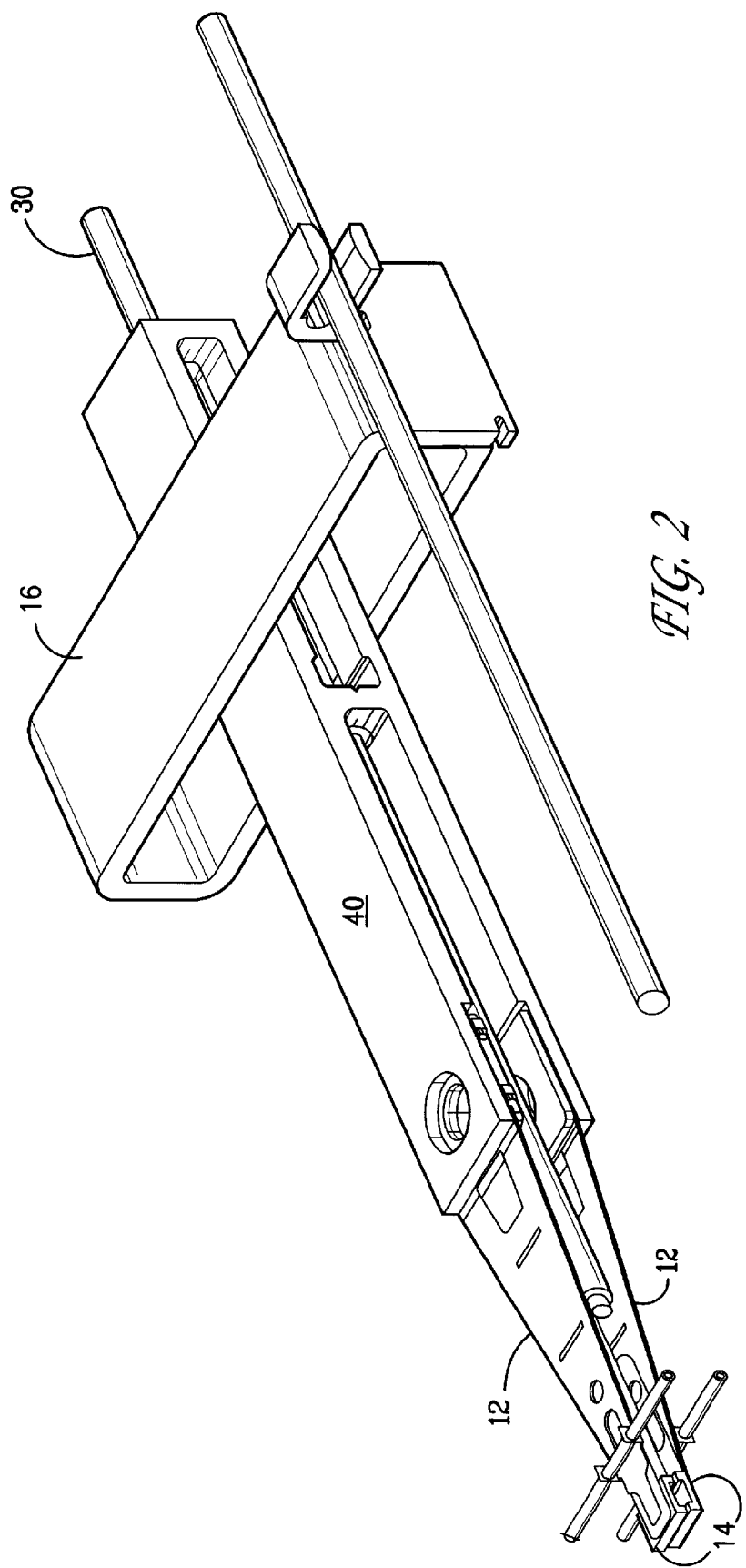
FIG. 2 is a perspective view of the actuator of the present invention.

The disk drive further comprises a spindle motor 18 capable of rotating the recording medium of a disk cartridge at a predetermined operating speed. FIG. 2 shows the actuator 10 in more detail. The carriage assembly 40 moves the arms 12 and heads 14 into engagement with the disk. It travels on bearings which ride on rod 30.

Figure 3:
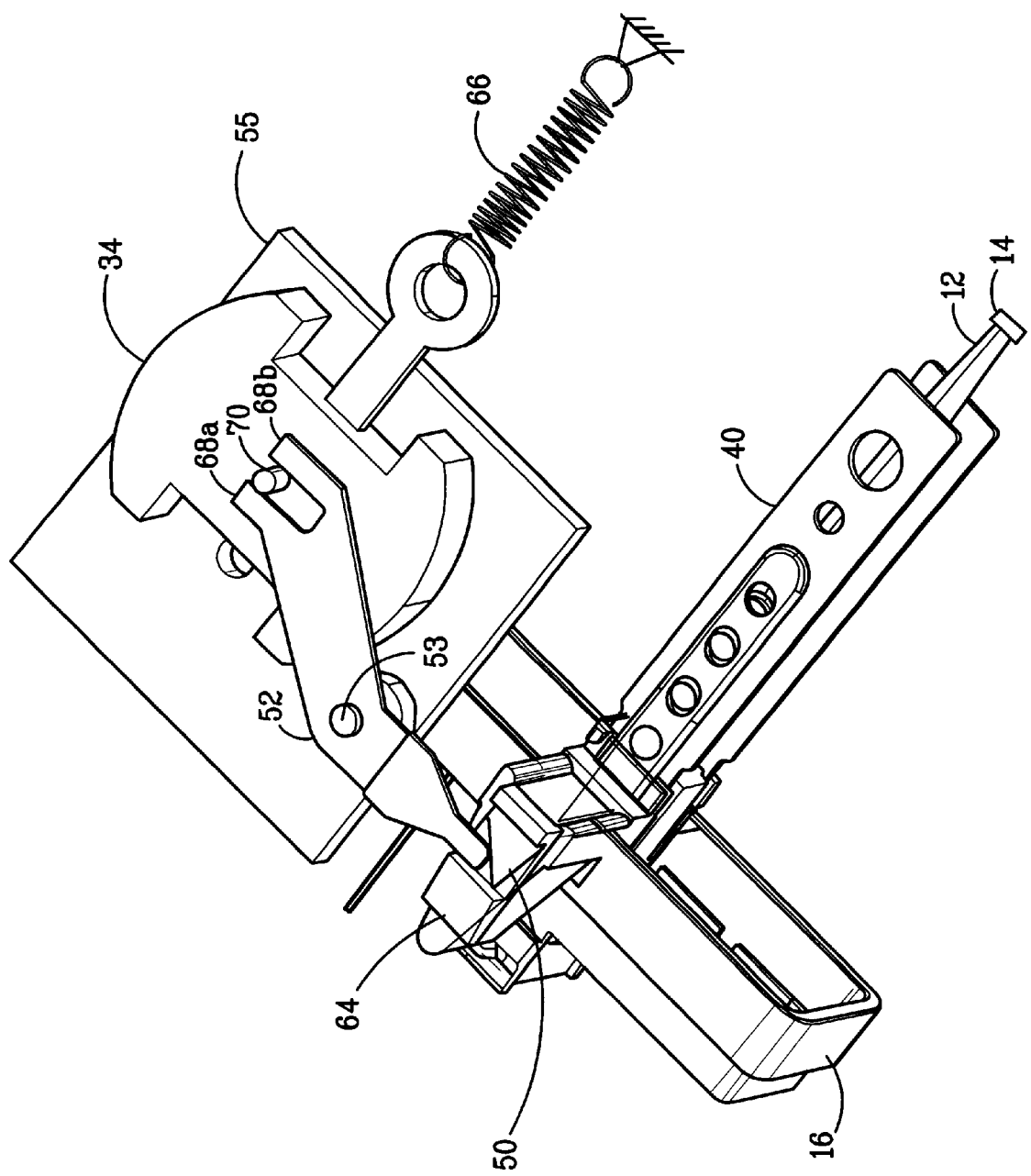
FIG. 3 is an isometric view of the latch of the present invention.

Referring to FIG. 3, the present invention comprises a latch including a latching groove 50 on the carriage assembly. An arm 52 rotates about a pivot 53 in the chassis of the disk drive. (A portion of the chassis 55 is shown in FIG. 3.) A counterweight 54 is moved linearly by the other end of arm 52.

Figure 4:
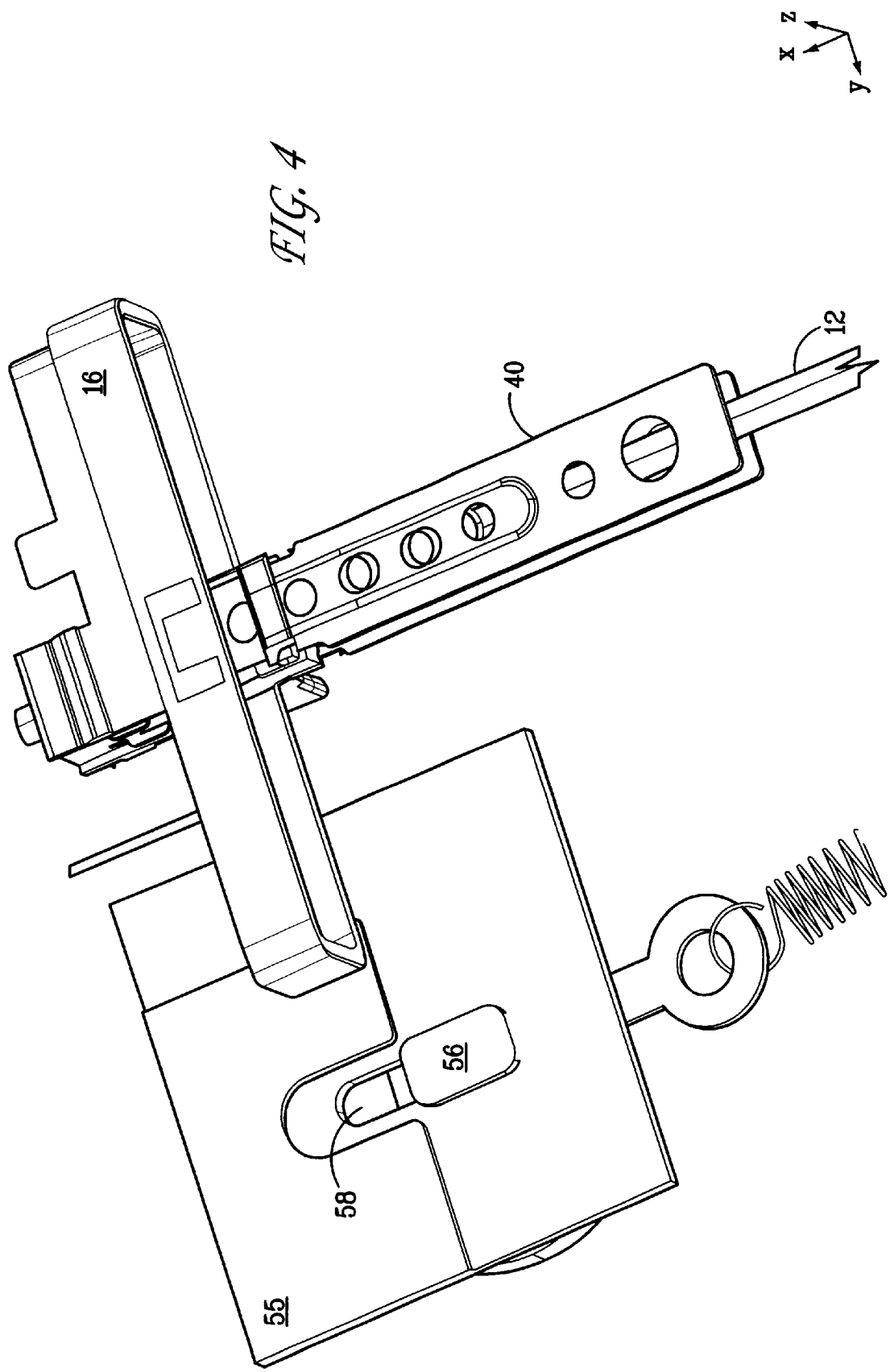
FIG. 4 is a bottom view of the latch of the present invention.

Referring to FIG. 4 a key 56 on the bottom of the counterweight 54 slides linearly in a slot 58 as the carriage assembly moves linearly. The key 56 fits into a keying portion 60 of the slot 58. The slot 58 is in the chassis 55 of the drive. The key 56 is constrained by the keying portion 60 so that the counterweight cannot move linearly if the counterweight is titled as by gravity, or shock, or the like.

Figure 6:
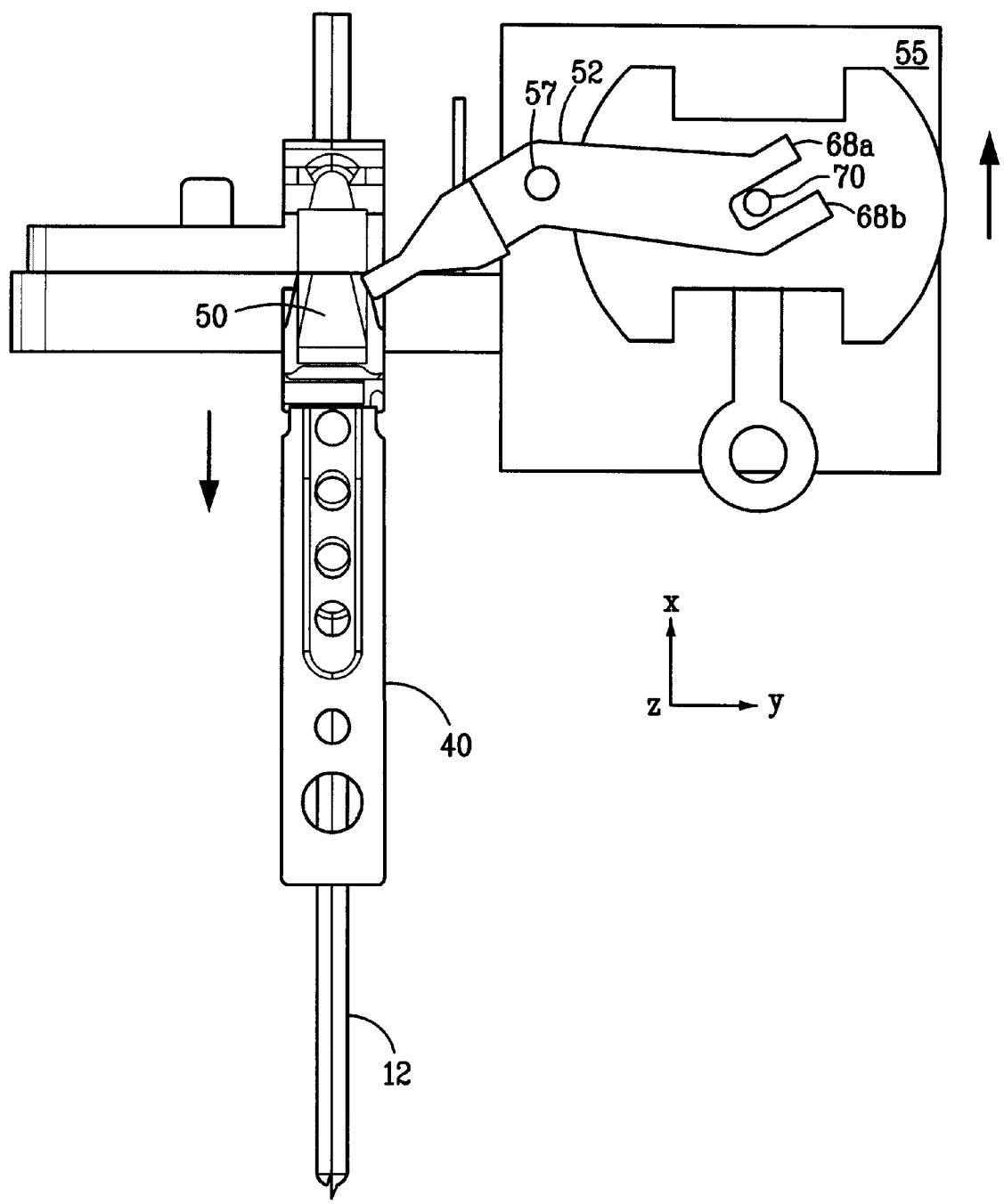
FIG. 6 is a similar to FIG. 5, but shows the latch in the unlatched position.
Figure 7:
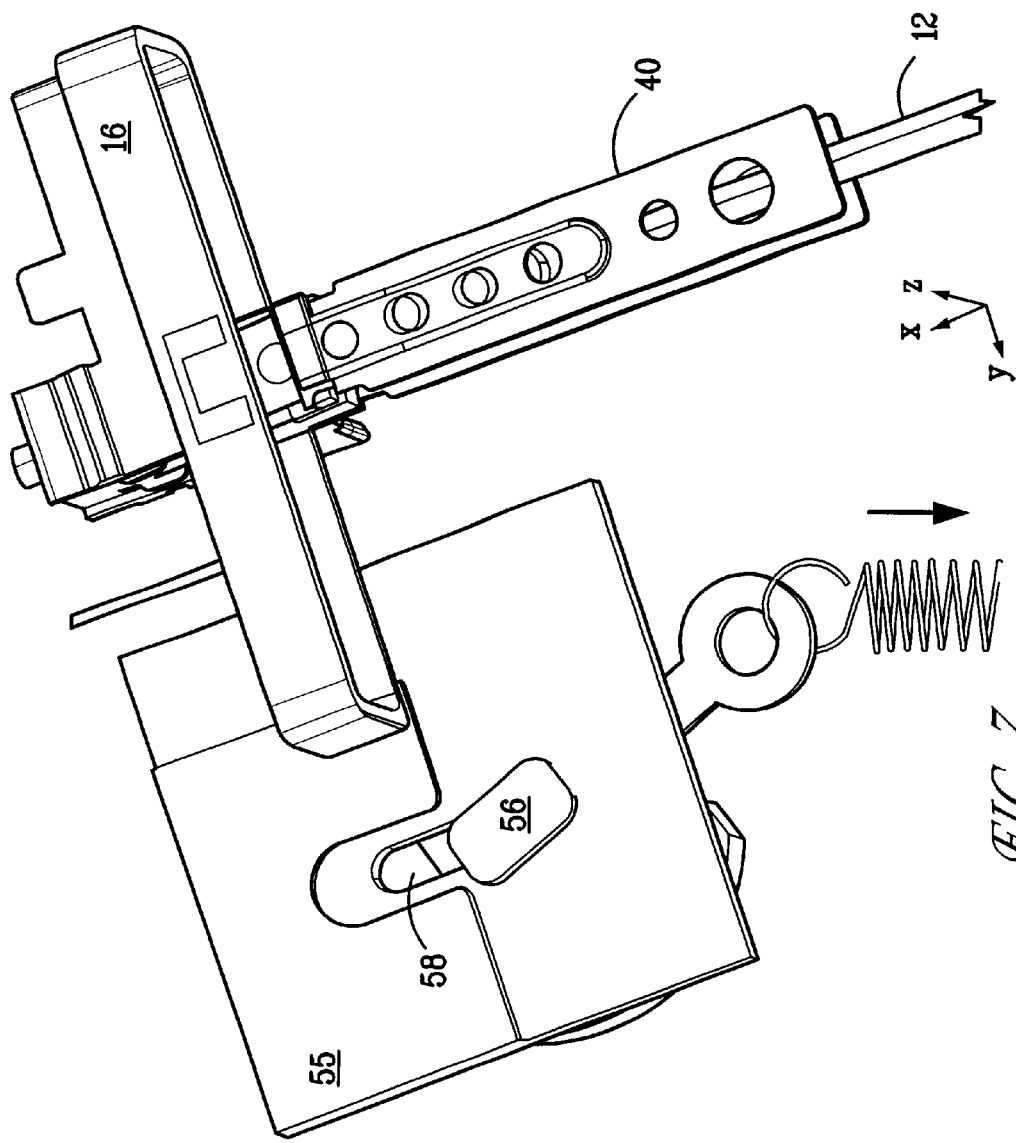
FIG. 7 depicts the action of the counterweight under a rotary shock condition.

The carriage assembly can move from a park position (FIG. 5) in a direction wherein the heads engage the disk (FIG. 6) only if the key 56 is level. If the drive is in a rotary shock condition, such as shown in FIG. 7, the key 56 is cocked with respect to the slot and cannot move linearly in the slot.

A load ramp 64 on the carriage assembly moves one end of the rotary arm 52 into latching groove 50 when the carriage assembly is moved into a park position.

A spring 66 is hooked at one end to the chassis and is hooked at the other end to the counterweight 54. The spring 66 biases the rotary arm toward the latched, or parked, position.

The other end of rotary arm 52 has a fork having two tongs 68a and 68b which capture a pin 70 on the counterweight (FIG. 3). This allows the counterweight to move linearly in the same direction as carriage assembly 40 when the arm 52 rotates.

Figure 8:
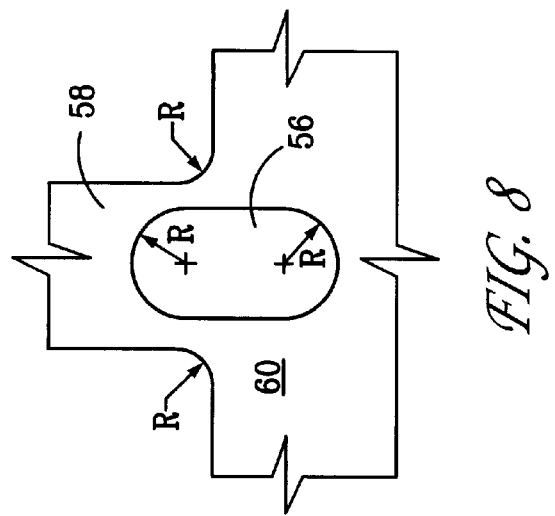
FIG. 8 shows the rounded key in the key slot on the chassis.

FIG. 8 shows how the key 56 has a rounded shape which slides against the rounded corner of the keying slot 60.

The operation of the head protect mechanism of the invention is as follows. The moving portion of the carriage assembly 40 has read/write heads 14, a coil 16 to generate electromotive force, and a bearing arrangement for sliding on a center rod 30 of a ZIP® 250, Sybil, drive. A loading ramp 64 is added to the carriage of the head actuator. The loading ramp 64 is used to load the rotary arm 52 into the latching groove 50 when the carriage assembly moves to the park position. When the actuator moves rearward to park, the rotary arm 52 flexes out of plane and slides into the latching groove 50.

The chassis 55 is the structural body of the drive. The pivot 53, key slot 58, and the ground hook for spring 66 are all a part of the chassis (or the body of the drive).

The counterweight 54 slides within the key slot 58. The moment of force, due to gravity, acting on both arms of the rotary arm 52 is balanced by determining an appropriate weight for the counterweight 54. The key slot 58 allow the key 56 on the counterweight to slide in the key slot 58 when the counterweight 54 is not tilted.

Figure 5:
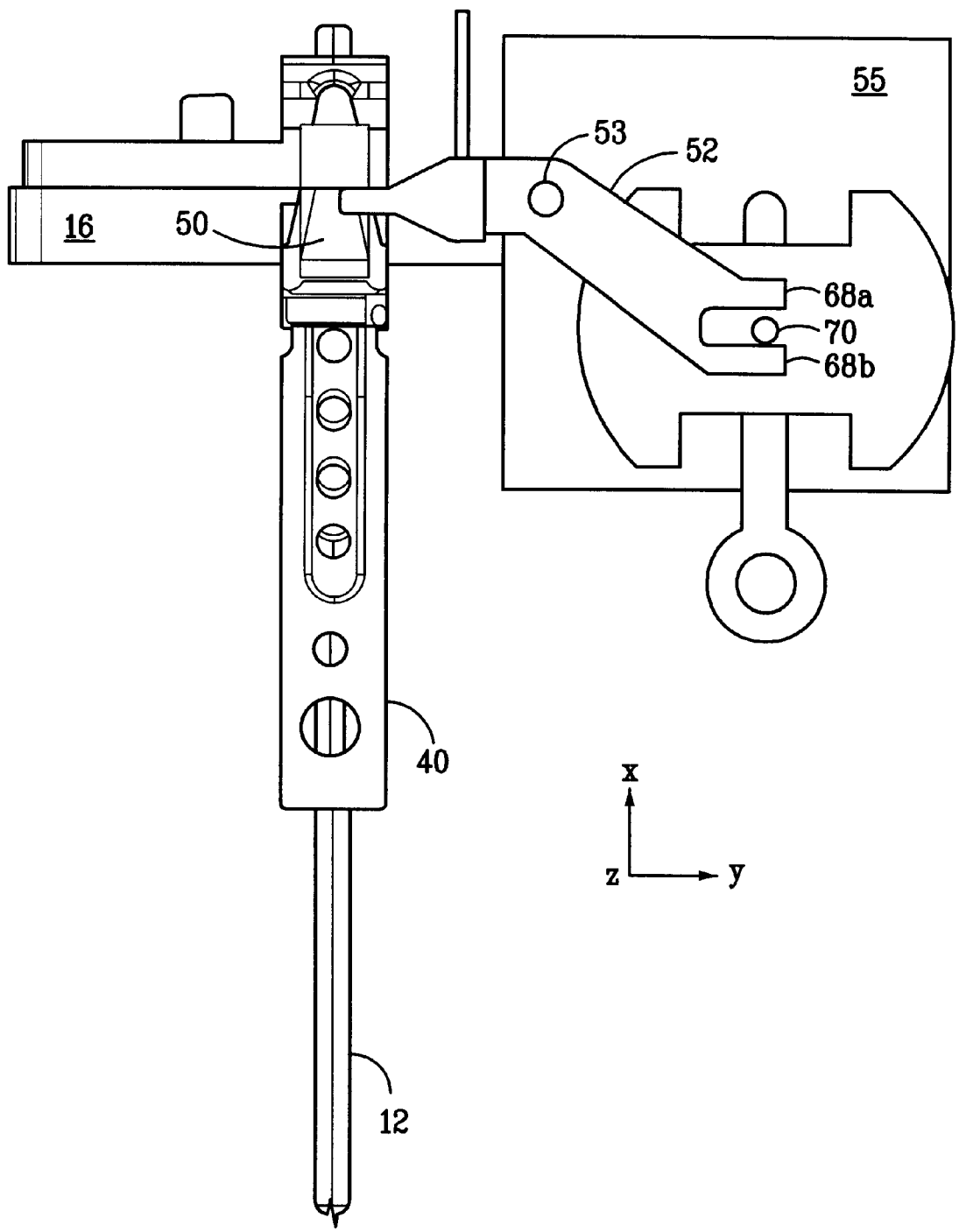
FIG. 5 is a top view showing the latch in the latched position.

The latched position of the head protect system is shown in FIG. 3. Under any linear shock condition the forces acting on the head actuator also act on the counterweight. Hence the forces should balance each other to keep the head actuator in the parked position. The electromechanical force acting on the coil 16 of the head actuator to bring the head out from the parked position is also used to unlatch the latch. Since the electromechanical force is only acting on the head actuator end of the rotary arm, the counterweight slides accordingly. The unlatching action is shown in FIG. 6. The spring 66 is used to reset the position of the rotary arm and the counterweight after the heads move out from the parked position. During the parking action the rotary arm slides on the ramp 64 and springs back into the latching groove 50. Under any rotary shock condition the counterweight 54 tilts and stops the counterweight from sliding into the key slot 58, as shown in FIG. 5.

In the claims:

1. An inertial latch for a linear actuator disk drive of the type including a carriage assembly carrying read/write heads linearly into and out of engagement with a recording medium, said latch comprising:

a latch on said carriage assembly;

an arm rotating about a pivot, one end of said arm engaging said latch;

a counterweight on the other end of said arm; and a key on said counterweight, said key sliding linearly in a slot as said carriage assembly moves linearly, said key fitting into a keying portion of said slot, said key being constrained by the keying portion of said slot so that said counterweight cannot move if it is tilted by gravity.

2. The inertial latch recited in claim 1 wherein said disk drive has a chassis on which said carriage assembly is mounted, said slot being in said chassis.

3. The inertial latch recited in claim 2 further comprising a spring hooked at one end to said chassis and hooked at the other end to said counterweight, said spring biasing said rotary arm toward the latched position.

4. The inertial latch recited in claim 2 wherein said pivot is in said chassis.

5. The inertial latch recited in claim 1 wherein said carriage assembly moves said read/write heads from a park position into a position in which said read/write heads engage said recording medium and wherein said latch comprises:

a latching groove, said one end of said arm engaging said latching groove when said carriage assembly is in the park position.

6. The inertial latch recited in claim 5 further comprising:

a loading ramp on said carriage assembly, said loading ramp moving said one end of said arm into engagement with said latching groove as said carriage assembly moves to said park position.

7. The inertial latch recited in claim 1 wherein the moment of force, due to gravity, acting on both ends of said rotary arm, is balanced.

8. The inertial latch recited in claim 1 wherein said linear actuator includes a voice coil motor comprising:

a coil mounted on said carriage assembly, said coil interacting with magnets in said drive to move said carriage assembly linearly.

9. The inertial latch recited in claim 8 wherein said latch is mounted on said coil.

10. The inertial latch recited in claim 1 wherein said other end of said rotary arm has a fork which captures a pin on said counterweight so that said key on said counterweight moves linearly in said slot as said arm rotates.

* * * * *